No. 644,163. Patented Feb. 27, 1900.
J. FAUST.
VEHICLE BRAKE.
(Application filed Nov. 27, 1899.)
(No Model.) 2 Sheets—Sheet 1.
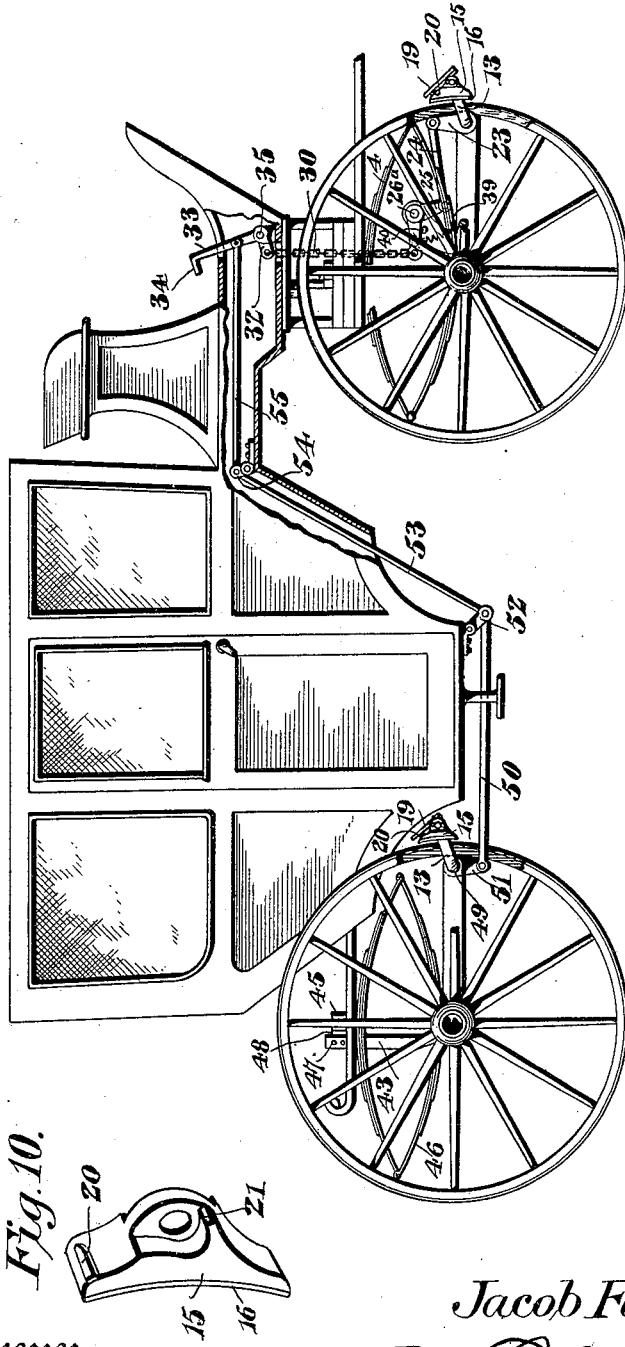
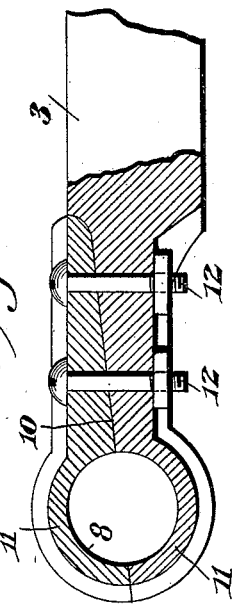
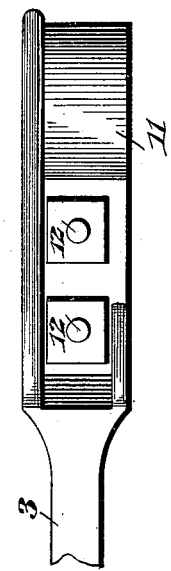
Witnesses
Jas. H. McCathran.
R. M. Smith.
Jacob Faust, Inventor
By E. G. Siggers
Attorney
THE NORRIS PETERS CO., PHOTO-LITHO., WASHINGTON, D. C.

No. 644,163. Patented Feb. 27, 1900.
J. FAUST.
VEHICLE BRAKE.
(Application filed Nov. 27, 1899.)
(No Model.) 2 Sheets—Sheet 2.
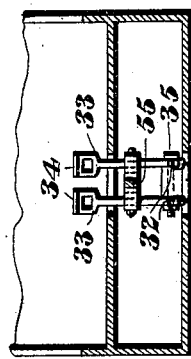
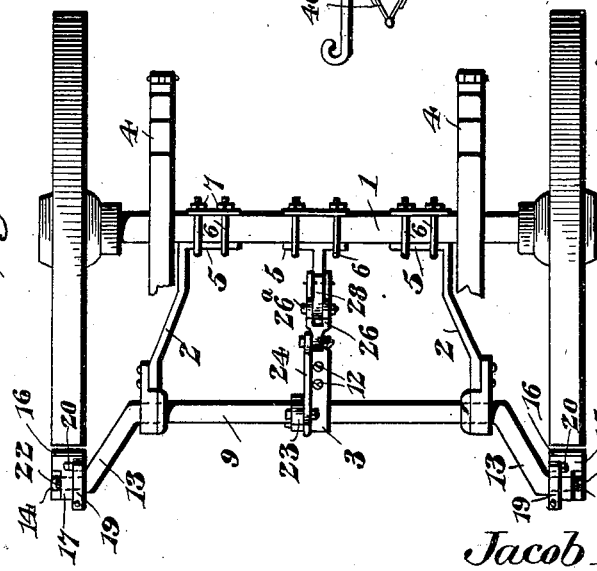
Jacob Faust, Inventor
Witnesses
Jas. F. McCathran.
R. M. Smith.
By
E. G. Siggers, Attorney

UNITED STATES PATENT OFFICE.

JACOB FAUST, OF SCRANTON, PENNSYLVANIA.

VEHICLE-BRAKE.

SPECIFICATION forming part of Letters Patent No. 644,163, dated February 27, 1900.

Application filed November 27, 1899. Serial No. 738,405. (No model.)

*To all whom it may concern:*

Be it known that I, JACOB FAUST, a citizen of the United States, residing at Scranton, in the county of Lackawanna and State of Pennsylvania, have invented a new and useful Vehicle-Brake, of which the following is a specification.

In vehicle-brakes as ordinarily constructed and applied considerable difficulty and annoyance have been experienced in setting or applying the brake-shoes to the wheels due to the fact that when the wheels were suddenly elevated or depressed by running over obstacles or into ruts the brake-shoes would leave or move away from the wheels and fail to subsequently reseat themselves properly.

The object of the present invention is to provide a vehicle-brake in which the parts are so constructed and arranged that the brake-shoes will always follow the wheels whether they are suddenly depressed or elevated and apply the necessary brake-power.

It is also the object of this invention to provide brake-shoes for all of the wheels of the vehicle and to set said shoes by connections leading to a foot lever or treadle.

Another object of the invention is to provide the necessary bracing or support for the axles which may be subjected to a twisting strain and which will therefore communicate an undesirable twisting strain to the vehicle-springs upon which the vehicle-body is supported.

One of the main objects of the invention is to provide brake connections which will not be rendered partially or wholly useless by the swinging of the hounds or other portions of the frame when turning the vehicle.

Other subordinate advantages and objects of the invention will appear in the course of the ensuing description.

The invention consists in a vehicle-brake embodying certain novel features and details of construction and arrangements of parts, as hereinafter fully described, illustrated in the drawings, and incorporated in the claims.

In the accompanying drawings, Figure 1 is a side elevation of a vehicle, showing the brake of this invention applied thereto. Fig. 2 is a detail plan view of the front axle, showing the manner of supporting the rock-shaft or brake-beam on the axle. Fig. 3 is a vertical transverse section taken adjacent to the front axle and passing through the fifth-wheel and also through a portion of the vehicle-body, showing the brake connections. Fig. 4 is an enlarged detail vertical longitudinal section taken through the front axle and showing a portion of the brake mechanism. Fig. 5 is a reverse plan view of the end portion of one of the brackets in which the rock-shaft or brake-beam is journaled. Fig. 6 is a vertical longitudinal section of the same. Fig. 7 is a detail vertical longitudinal section similar to Fig. 4, showing a slight modification in the brake connections. Fig. 8 is a detail vertical section taken on the line X X of Fig. 7. Fig. 9 is a detail vertical section showing the manner of bracing the rear axle with relation to the frame of the carriage-body. Fig. 10 is a perspective view of the brake-shoe, illustrating the rib thereon which affords a bearing for the pressure-spring and also shows the shoulder adapted to coact with an offset brake-beam for limiting the repression of said shoe under the action of the spring.

Similar numerals of reference designate corresponding parts in all the figures of the drawings.

I have illustrated the brake forming the subject-matter of this invention applied to a vehicle of the type commonly known as a "hack" or "coupé," as shown in Fig. 1, wherein it will be seen that an independent brake-shoe is employed for each wheel of the vehicle and adapted to be thrown into contact with the tire or rim of the wheel.

In carrying out the present invention I employ, in connection with the front axle 1, a series of brackets 2 and 3, 2 designating the outer or end brackets, which are arranged near the body-supporting springs 4, and 3 indicating the intermediate bracket, which is arranged about centrally between the brackets 2. Each of the brackets is provided at one end with an L-shaped extension 5, which is embraced by one or more axle-clips 6, which also embrace the axle and are secured thereon by means of nuts 7 in the ordinary manner. The brackets may be welded or formed integrally with the axle; but it is preferable to secure them by means of clips, as it enables the brake mechanism to be applied to a vehicle already constructed. Each of the brackets 2 and 3 is provided at its outer end with a bearing 8, in which is journaled a rock-shaft 9, which constitutes the brake-beam for the front wheels. Each arm at its outer end is of sectional construction, as shown in Fig. 6, being divided on a longitudinal line 10, cut on a taper or incline, as shown. The sections of the bearing comprise the semicylindrical portions 11, in which the rock-shaft is journaled, and said sections are securely held together by means of a bolt 12, as clearly shown in Fig. 6, said construction enabling the rock-shaft or brake-beam to be detached or replaced whenever necessary.

The rock-shaft 9 has cranked end portions 13, terminating in oppositely-projecting spindle portions 14, upon which are journaled oscillatory brake-shoes 15, preferably faced with leather, as at 16, to provide for the necessary frictional grip of the shoes upon the tires of the wheel. Each shoe comprises a transversely-perforated lug 17, through which the spindle portion 14 of the rock-shaft 9 passes. The rock-shaft is provided adjacent to the lug 17 with a lateral extension 18, forming a spring-seat upon which is rigidly mounted one end of a leaf-spring 19, the opposite or free end of which is adapted to bear against one end of the brake-shoe for pressing said end toward the wheel-tire. The free end of the spring is preferably arranged to bear against a rib or projection 20, extending transversely across the rear side of the shoe, to prevent wear from coming directly on the shoe. In order to limit the movement of the shoe under the influence of the spring 19, a shoulder 21 is formed on the shoe which comes in contact with the extension 18 of the rock-shaft. The construction just described is illustrated more clearly by Fig. 10 of the drawings, and it enables the brake-shoe to adjust itself automatically to the wheel-tire, so as to contact with said tire throughout its entire length. The brake-shoe is held on the spindle portion 14 by means of a pin 22, passing through a perforation in the end of the spindle.

The rock-shaft or brake-beam 9 is provided adjacent to the intermediate bracket 3 with a rigidly-attached crank-arm 23, to the outer end of which is loosely or pivotally connected one end of a rod, chain, or other brake connection 24, the opposite end of which is likewise connected to the end of one arm 25 of a bell-crank 26, which is fulcrumed on a laterally-extending bracket 28, offset from and preferably formed integrally with the intermediate bracket 3, as best shown in Fig. 4. The other arm 29 of the bell-crank is bifurcated to straddle the bracket 28, and the ends of the branches of the arm 29 are provided with openings to receive a pair of operating-chains 30, which pass upward through the fifth-wheel and bolster and also through an opening 31 in the floor of the vehicle, where they connect, respectively, with the short arms 32 of a pair of elbow-levers or foot-treadles 33, the upper ends of which are offset rearwardly, as shown at 34, the upper portions of the foot-levers being slotted in the form of stirrups, so as to enable the heels of the driver to be engaged with the treadles for obtaining a positive hold thereon, the object also being to enable a longer stroke to be imparted to the treadle-levers in applying the brakes, a stroke of considerable length being required on account of the slack in the chains or flexible connections 30, the reasons for which will hereinafter appear. The treadle-levers are fulcrumed on a horizontal pin or bolt 35, and when thrust forward the shorter arms 32 thereof are elevated for drawing upward on the chains 30 and rocking the bell-crank 26, so as to operate through the connection 24 on the rock-shaft 9 for applying the brake-shoes to the wheels in a manner that will be readily understood in view of the foregoing description.

By reference to Fig. 3 it will be seen that the chains 30 pass through the fifth-wheel and bolster and lie on opposite sides of the longitudinal body-brace 36. Now as the front axle is turned one of the hounds 37 will carry the lower portion of one of the chains 30 beneath the body-brace 36 and render said chain useless or inoperative for the purpose of applying the brakes. For this reason two chains are employed, so that when one is rendered useless in the manner above described the other or remaining chain will be undisturbed and adapted to properly operate upon the remainder of the brake connections. When, therefore, the vehicle is turned to the right, the driver presses upon the left treadle for operating that chain, and when the vehicle is turned to the left the driver presses upon the right-hand treadle. While two connections 30 are required between the treadle-levers and the bell-crank 26, but one connection 24 is required between the bell-crank and the rock-shaft or brake-beam.

In Figs. 7 and 8 I have illustrated a slightly-different arrangement of some of the parts of the brake mechanism, which, however, involve the same principle or mode of operation. In said figures the bell-crank shown at 26' is fulcrumed adjacent to the front axle 1', and its upwardly-extending arm 25' is coupled by means of a connecting-rod 24' to the crank-arm 23 of the rock-shaft 9. The other arm 29' of the bell-crank is connected by means of an open or loop-shaped link 38 with the chains 30. Under the construction shown in Fig. 4 the bell-crank is retracted for offsetting the brake-shoes by means of a contractile spring 39, secured to one arm of the bell-crank and its other end to the center bracket 3, while the movement of the bell-crank is limited by means of a stop-pin 40. In Fig. 7 the contractile spring (indicated at 41) is interposed between the center brace and the connecting-rod 24' for the same purpose. The connecting-rod 24' is also provided intermediate its ends with a turnbuckle 42 for adjusting the length thereof.

In order to properly brace and support the rear axle, posts or standards 43 are connected to the rear axle by means of clips 44. These posts or standards extend upward behind the cross-bar 45, which connects the tops of the body-supporting springs 46. The upper ends of the standards 43 are connected by a transverse bar 47, and one or more pieces or strips of rubber 48, forming buffers, are interposed between the bars 45 and 47 to prevent noise and scraping as the cross-bar 45 moves up and down when the springs yield under the load of the vehicle. It will be understood that when the brake-shoes are applied to the rear wheels as well as to the front wheels there is a tendency to twist or rock the axles on account of the fact that the brake-shoes are carried by and supported from the axles, and the tendency when the brake-shoes are clamped against the wheels is to carry the brake-shoes downward or upward, as the case may be. In order to overcome this tendency, the bracing mechanism just described in connection with the rear axle is employed. Similar bracing devices may be used for the front axle, although ordinarily the fifth-wheel and bolster will compensate for any twisting tendency of the brakes on said axle.

The rear brake-shoes are mounted upon a rock-shaft 49, similar in construction and arrangement to the front rock-shaft, and the rock-shaft 49 is operated by means of a rod or other connection 50, connected with the crank-arm 51 of said rock-shaft at one end and at its opposite end to a pivotal link 52, connected to the body of the vehicle and also to the adjacent end of another rod or connection 53, which extends forward and upward at an inclination passing through the portion of the vehicle-body, and connecting at its opposite end to a second link 54 and also at its other end to another rod or connection 55, which is pivotally attached at its forward end to one of the treadle-levers 33.

In view of the above description it will be seen that an independent brake-shoe is used for each wheel and that all of the brake-shoes may be simultaneously thrown into operative engagement with their respective wheels by the driver actuating one or both of the treadle-levers; also, that the front brake-shoes may be set no matter which way the vehicle may be turning, which result is accomplished by the employment of the two chains or connections 30, hereinabove described. It will also be seen that by mounting the brake beams and shoes on the axle the brake-shoes will follow the wheels at all times, or, in other words, move upward or downward with the axles upon which they are respectively supported, thus securing a proper application of the brakes at all times; also, that I have provided means for effectively bracing the axles against twisting strain, thereby preventing such strain from being communicated to the springs upon which the vehicle-body is sustained. In lieu of the bell-crank 26 or 26' a grooved pulley or roller may be employed; but the bell-crank is preferred, as it is more effective and reliable in practice and obviates the necessity for flexing or bending the connections between the treadle-levers and the rock-shaft, thus increasing the durability of said parts.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described the invention, what is claimed as new, and desired to be secured by Letters Patent, is—

1. In a vehicle-brake, the combination of a brake-beam, a plurality of flexible connections passing through a fifth-wheel, and multiple operating devices separately associated with said flexible connections and adapted individually to operate the brake-beam through one of the series of flexible connections, as set forth.

2. In a vehicle-brake, the combination of a brake-beam, means for supporting said brake-beam on an axle, a plurality of flexible connections passing through the fifth-wheel between the hounds and on opposite sides of the body-brace, and separate operating devices connected individually to said flexible connections and operable independently to apply the brake-beam through one of the series of flexible connections, as set forth.

3. In a vehicle-brake, a brake-beam supported by brackets on the axle, in combination with an operating-lever, a bell-crank situated between the said lever and beam, a connection between the beam and bell-crank, and a flexible connection between the bell-crank and operating-lever, substantially as specified.

4. In a vehicle-brake, the combination with one of the axles, and a series of brackets thereon, of a brake-beam journaled in said brackets, an operating-lever, a bell-crank mounted on one of said brackets, a connection between said beam and bell-crank, and a flexible connection between the bell-crank and operating-lever, substantially as specified.

5. In a vehicle-brake, a brake-beam supported by brackets on the axle, in combination with a plurality of operating-levers, a bell-crank situated between said lever and beam and comprising one single arm and one bifurcated arm, a connection between the single arm and the beam, and flexible connections between the bifurcated portions of the other arm and the operating-levers, substantially as specified.

6. In a vehicle-brake, a brake-beam supported by brackets on the axle, in combination with an operating-lever, a bell-crank situated between said lever and beam, a connection between the beam and bell-crank, a flexible connection between the bell-crank and operating-lever, a retracting-spring for the bell-crank, and a stop-pin for the bell-crank, substantially as and for the purpose specified.

7. In a vehicle-brake, the combination with one of the axles, and a series of brackets thereon having divided bearings, of a journaled brake-beam detachably mounted in said bearings, an operating-lever, a bell-crank between said beam and lever, and connections between the beam, bell-crank and operating-lever, substantially as set forth.

8. In a brake, the combination with a turning axle, and a fifth-wheel, of brackets carried by the axle, a brake-beam in said brackets, independent brake-operating devices on a vehicle-body, and independent trains of operative connections extending through the fifth-wheel and associated with the brake-beam and with the brake-operating devices for actuation individually thereby, substantially as described.

9. In a vehicle-brake, a brake-beam having a crank-arm, a lateral extension or offset on said crank-arm, and a spindle projecting from the crank-arm, combined with a brake-shoe journaled on said spindle, a spring having one end fixed to said extension or offset and its free end seated on one end of the brake-shoe, and a stop-shoulder on the shoe coöperating with the extension or offset of the beam to limit the repression of the shoe under pressure of said spring, substantially as described.

10. In a vehicle-brake, the combination with a brake-beam having a spindle portion, of a brake-shoe journaled thereon, stop-shoulders on said beam and shoe and a spring connected to the brake-beam and pressing against the shoe, whereby the shoe is rendered self-adjusting, substantially as described.

11. In a vehicle-brake, a brake-beam supported by brackets on the axle, in combination with an axle-brace comprising a standard rigidly connected to the axle, and bearing against one of the transverse bars of the frame of the vehicle-body, substantially as described.

12. In a vehicle-brake, a brake-beam supported by brackets on the axle, and operating means therefor, in combination with a pair of standards rigidly secured to the axle, a cross-bar connecting the ends of said standards, vehicle-springs supported on the axle, a cross-bar connecting the upper portions of said springs, and a buffer interposed between the two cross-bars, substantially as and for the purpose specified.

In testimony that I claim the foregoing as my own I have hereto affixed my signature in the presence of two witnesses.

JACOB FAUST.

Witnesses:
JOHN LENTES,
MAX FIERSSON.